United States Patent [19]

Möller

[11] Patent Number: 5,156,068

[45] Date of Patent: Oct. 20, 1992

[54] BEARING MEANS FOR COMPENSATING MASSES

[75] Inventor: Heribert Möller, Sachsen, Fed. Rep. of Germany

[73] Assignee: MAN Nutzfahrzeuge Aktiengesellschaft, Munich, Fed. Rep. of Germany

[21] Appl. No.: 682,195

[22] Filed: Apr. 4, 1991

[30] Foreign Application Priority Data

Apr. 4, 1990 [DE] Fed. Rep. of Germany ....... 4010856

[51] Int. Cl.⁵ ................................. F16C 3/04
[52] U.S. Cl. ........................... 74/605; 74/595; 74/604; 123/192.2
[58] Field of Search ............ 74/603, 604, 605; 123/192.1, 192.2

[56] References Cited

U.S. PATENT DOCUMENTS

| | | | |
|---|---|---|---|
| 2,131,170 | 9/1938 | Evans | 74/605 |
| 2,730,912 | 1/1956 | Marinelli | 74/605 X |
| 3,667,317 | 6/1972 | Hillingrathner | 74/604 |
| 4,425,821 | 1/1984 | West | 123/192.2 |
| 4,622,864 | 11/1986 | Fetouh | 74/605 X |
| 4,763,760 | 8/1988 | Haman et al. | 74/605 X |
| 4,766,857 | 8/1988 | Lainé et al. | 123/192.2 |
| 4,802,450 | 2/1989 | Roberts | 74/604 X |
| 4,899,704 | 2/1990 | Kronich | 123/192.2 |
| 5,065,644 | 11/1991 | Shimada | 74/603 |

FOREIGN PATENT DOCUMENTS

| | | | |
|---|---|---|---|
| 3737296 | 6/1988 | Fed. Rep. of Germany | 74/604 |
| 1-97194 | 8/1989 | Japan | 74/605 |

Primary Examiner—Vinh T. Luong
Attorney, Agent, or Firm—Robert W. Becker & Associates

[57] ABSTRACT

A bearing for compensating masses for compensation of forces due to inertia as well as moments of inertia is in the form of a constructive unit made of the compensating masses and the support, whereby the outer mantle surface of the compensating masses provide the support surface. Furthermore, the compensating masses and the gear wheel comprise a unit whereby the exact angular coordination of crank shaft and compensating mass is ensured. The bearing arrangement results in a secondary mass compensation.

6 Claims, 2 Drawing Sheets

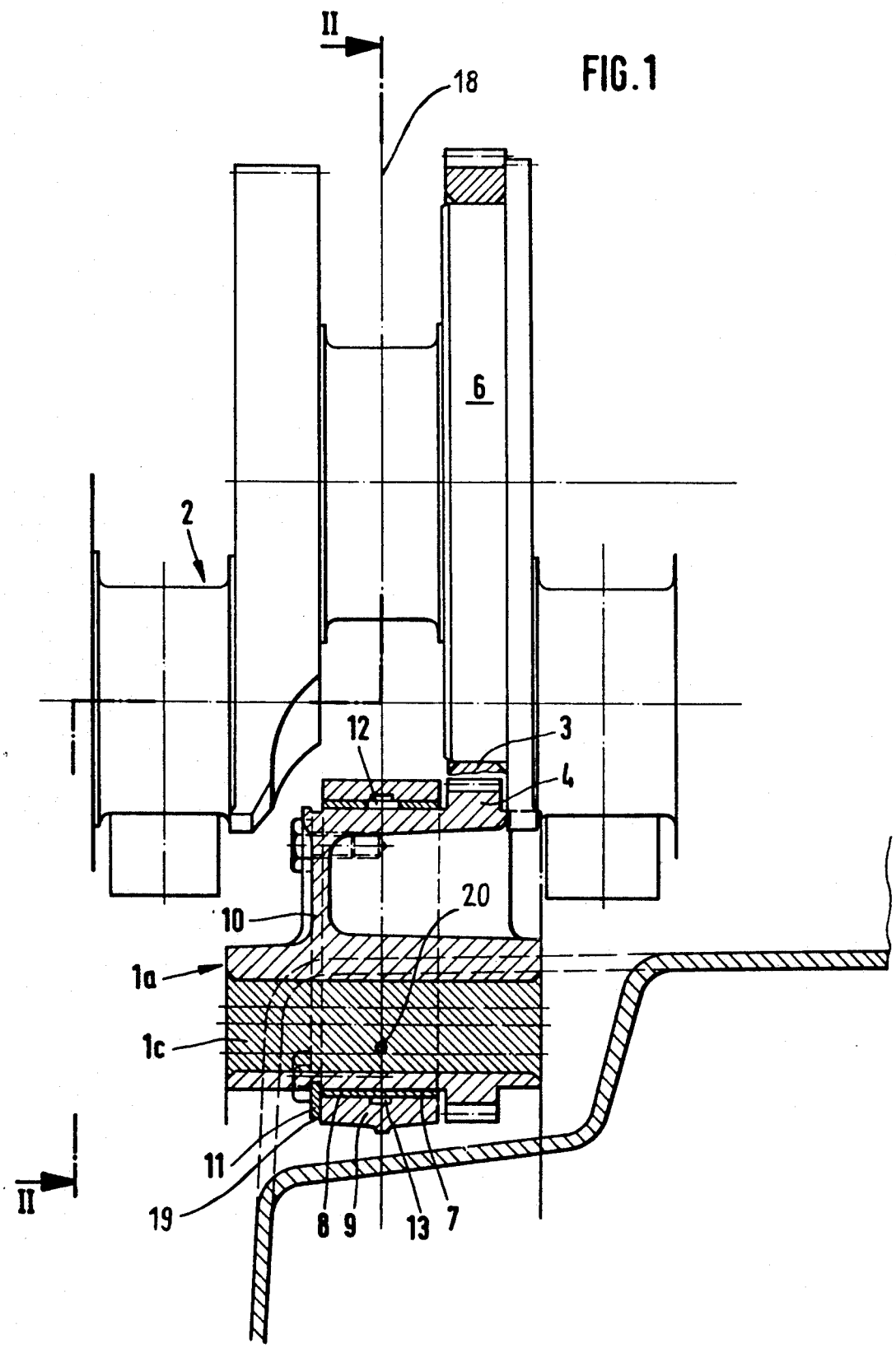

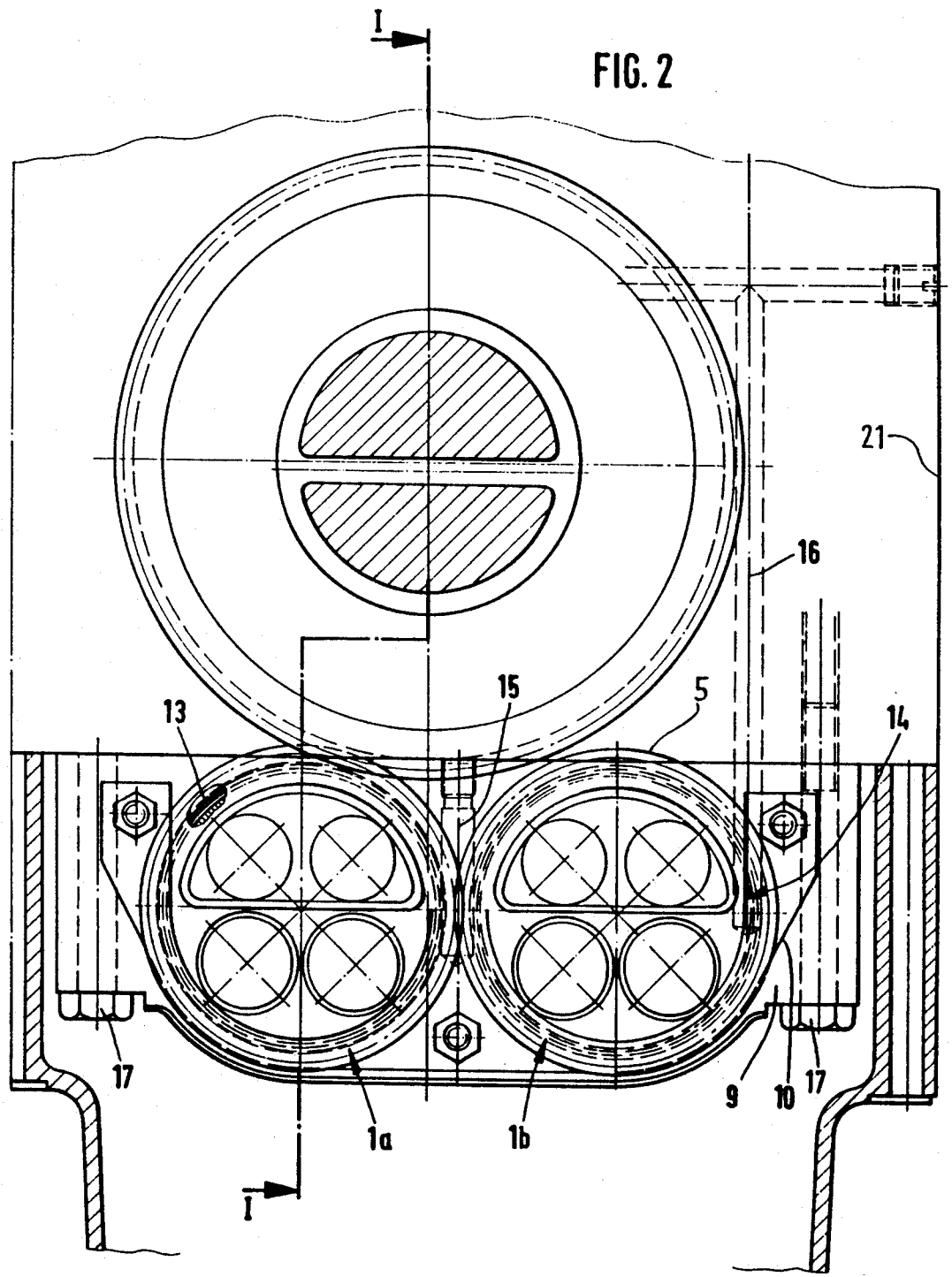

BEARING MEANS FOR COMPENSATING MASSES

BACKGROUND OF THE INVENTION

1. Field of the Invention

The present invention relates to a bearing means for masses that compensate secondary forces due to inertia and secondary moments of inertia, whereby the compensating masses are supported in a housing that is flanged to a crank case and are driven via a toothed wheel, that is connected to a crank web arranged adjacent to a symmetry plane of a crank shaft and intermeshes with a first gear wheel. The first gear wheel is fixedly connected to the first one of the compensating masses and intermeshes with a second gear wheel that drives a second one of the compensating masses.

2. Description of Related Art

It is known from U.S. Pat. No. 3 667 317 to compensate secondary forces due to inertia by providing two compensating shafts that are arranged parallel to the crank shaft and are driven via a toothed wheel by the crank shaft such that they rotate in opposite directions relative to one another at the double rotation speed of the crank shaft. A toothed wheel of the crank shaft is arranged at a crank web that is adjacent to a symmetry plane of the crank shaft and intermeshes with a first gear wheel of the first compensating shaft, whereby the second compensating shaft is driven by a second gear wheel that intermeshes with the first gear wheel. Compensating masses are fixedly connected to the two compensating shafts. The compensating shafts are supported with both ends at a housing that is flanged to a crank case. Compensating shafts, gear wheels, and compensating masses are separate pieces and must be assembled in a difficult mounting step. Due to the required assembly, the exact positioning and permanent coordination of the compensating masses and the gear wheels which is important for the desired complete mass compensation is difficult to achieve. Since the compensating masses are arranged on both sides of the crank shaft, they may not be arranged between two adjacent cylinders, because the compensating masses may not exceed a certain length in order to avoid a collision of the compensating masses with the crank web respectively the piston rod. On the other hand, the diameter of the toothed wheel that is connected to the crank web may not be too large in order to avoid contact of the toothed wheel with a piston in its lower dead center position. This means that the compensating shaft may not be positioned too far away from the crank shaft center so that the radial extension of the compensating mass is thereby limited.

It is therefore an object of the present invention to provide a bearing means for compensating masses of the aforementioned kind which are constructively designed such that, when considering the smallest possible piston rod gauge, the rotation axes of the compensation masses may be positioned as close as possible relative to the crank shaft center whereby the compensating masses still may be placed between two adjacent cylinders

SUMMARY OF THE INVENTION

The bearing means of the present invention is primarily characterized by: each of the compensating masses having an outer mantle surface in the form of a journal pin, whereby they are radially guided via a respective bushing at the housing in a direct manner and axially guided via a bearing bracket that is fastened to a free face of the housing and engages annular grooves of the compensating masses; each one of the compensating masses being an integral part of the respective gear wheel; and the housing having annular lubricant grooves that communicate via a bore in the housing with a lubricant line and a lubricant circulation system.

The direct radial support of the compensating masses according to the present invention requires only a minimal constructive expenditure for the desired mass compensation. The fixation of the compensating masses on the compensating shaft is eliminated together with the exact angular coordination of the compensating mass and the gear wheel, since according to the present invention both components are provided as an integral part. By employing a bearing bracket for the axial guidance of the compensating masses, machining of the interior of the housing for the abutment of the compensating masses is eliminated. The annular groove for the axial guidance, on the other hand, may be simply manufactured by rolling. By avoiding the separation of the compensating shaft and the compensating mass and by providing a separate housing, the bearing means for the compensating masses may be provided in a substantially shortened form so that the rotation axis may be disposed as close as possible to the center of the crank shaft since there is no danger of the piston rod with its free end colliding with the compensation shaft.

In a preferred embodiment of the present invention the integral part of gear wheel and compensating mass is provided in the form of a forged or cast piece. Accordingly, the shape of the compensating mass and the resulting position of the center of inertia may be freely selected and, without requiring additional mounting, the exact angular coordination of the compensating mass and the gear wheel is permanently ensured.

In a further embodiment of the present invention the compensating masses, for the compensation of the forces due to inertia and the moments of inertia, are formed such that a respective center of inertia is disposed at a distance from a symmetry plane of the crank shaft, whereby a product of the distance and the respective force of inertia totally compensates the respective moment of inertia.

In another embodiment of the present invention the compensating masses for the compensation of the forces due to inertia and the moment of inertia, are formed such that a respective center of inertia is disposed at a distance from a symmetry plane of the crank shaft, whereby a product of the distance and the respective force of inertia partially or completely compensates the respective moment of inertia.

Due to the shape of the compensating masses and the resulting position of the center of inertia either the forces due to inertia may be compensated without regarding moments of inertia or an additional intended cOmpensation of moments of inertia may be achieved.

BRIEF DESCRIPTION OF THE DRAWING

The objects and advantages of the present invention will appear more clearly from the following specification in conjunction with the accompanying drawing, in which:

FIG. 1 is a cross sectional view along the lines I—I of FIG. 2 exemplified for a serial four-cylinder four-stroke combustion engine having crank throws staggered at 180°; and FIG. 3 represents a cross sectional view along the lines II—II of the bearing means with compensating masses rotating in opposite directions.

DESCRIPTION OF PREFERRED EMBODIMENTS

The present invention will now be described in detail with the aid of several specific embodiments utilizing FIGS. 1 and 2.

FIG. 1 shows a cross section along the lines I—I of FIG. 2 representing a first compensation mass 1a which is driven by a crank shaft 2 via a toothed wheel 3 and a first gear wheel 4. The toothed wheel 3 is attached to a crank web 6 of the crank shaft 2. In order to compensate secondary forces due to inertia or moments of inertia the ratio of the teeth on the toothed wheel 3 and the first gear wheel 4 is 2 to 1.

The second compensating mass 1b (FIG. 2) is provided which rotates in an opposite direction relative to the first compensating mass 1a. The second compensating mass 1b is driven by a second gear wheel 5 that intermeshes with the first gear wheel 4 and is provided with the same number of teeth as the first gear wheel 4.

According to the present invention, the gear wheels 4 and 5 and the respective compensating masses 1a and 1b (FIG. 2) are provided as integral parts, which may be manufactured as integral forged or cast pieces. By providing integral parts the difficult mounting and exact angular positioning of the compensating masses 1a and 1b relative to their respective gear wheels 4 and 5 is avoided which during mass production leads to a considerable time and cost reduction. The bearing arrangement of the compensating masses 1a and 1b will now be described in detail as exemplified for the compensating mass 1a.

The compensating mass 1a has an outer mantle surface 7 in the form of a journal pin and is radially guided in a direct manner via a bushing 8 at the housing 9. The housing 9 is screwed to a crank case 21.

The compensating mass 1a is axially guided via a bearing bracket 10 that engages an annular groove 11 of the compensating mass 1a. The bearing bracket 10 is fastened to a free face 19 of the housing 9. For lubricating the bearing means the bushing 8 is provided with a lubricant boring 12 into which the lubricant from an annular oil groove 13 at the housing 9 may be introduced. An interruption of the lubricating action by rotating the bushing 8 relative to the housing 9 is thus prevented.

Due to the direct radial support of the compensating mass 1a and the integral construction of the compensating mass 1a with the first gear wheel 4, a compact construction is achieved so that the bearing means may be spaced at a smallest possible distance to the crank shaft center. Also, the mounting of the bearing means of the present invention is very simple. The respective coordination and alignment of compensating shaft, compensating mass and gear wheel according to the prior art is thus eliminated which is especially important in mass production since production time and labor costs are reduced.

In the represented example of a compensating means for a serial four-cylinder four-stroke combustion engine the compensating masses are driven via the toothed wheel 3 by the crank web 6 which is adjacent to the center of the engine. Due to the design of the compensating masses 1a and 1b (FIG. 2) their respective centers of inertia 20 are arranged directly in a center plane of the engine (symmetry plane) so that no moments of inertia are caused by respective forces due to inertia. In the case that also the compensation of moments of inertia is desired the compensating masses may be designed such that their respective center of inertia is positioned outside the symmetry plane thus resulting in counter moments of inertia. In order to increase the forces due to inertia the compensation masses 1a and 1b may be provided with borings 1c which may be filled with heavy metals such as for example lead, or into which heavy metal rods may be pressed.

A cross section along the lines II—II in the area of the compensating masses 1a and 1b rotating in opposite directions is shown in FIG. 2. In order to reduce the moments of friction occurring at the outer mantle surface of the compensating masses and to avoid seizing of the support, the lubrication of the compensating mass 1b is achieved via a bore 14 that communicates with the lubricant circulation system of the engine. The lubricant reaches a lubricating slot between the compensating mass 1b and the bushing 9 via a lubricant bore 16, a bore 14, a lubricant groove 13 provided at the housing 9 of the compensating mass 1b and finally a lubricating bore 12 (FIG. 1). The lubricant groove 13 of 1b corresponds to the respective lubricant groove 13, designated with the same reference numeral, of the compensating mass 1a as described above. A connecting bore 15 between the lubricant grooves 13 represents the connection of the lubricant circulation system from one compensating mass to the other.

The bearing bracket 10 which serves for the axial guidance of the compensating masses is flanged to a free face 19 of the housing 9. The housing 9 is attached to a crank case 21 via screws 17.

The direct support of the compensating masses 1a and 1b at the housing 9 in connection with providing the compensating masses 1a and 1b and the respective gear wheels 4 and 5 as integral parts results in a simple assembly and minimum axial dimensions of the bearing means in the area of the axis of rotation of the compensation masses.

The present invention is, of course, in no way restricted to the specific disclosure of the specification and drawings, but also encompasses any modifications within the scope of the appended claims.

What I claim is:

1. A bearing means for masses that compensate secondary forces due to inertia and secondary moments of inertia, with said compensating masses being supported in a housing that is flanged to a crank case, and being driven via a toothed wheel, that is connected to a crank web arranged adjacent to a symmetry plane of a crank shaft and intermeshes with a first gear wheel, with said first gear wheel being fixedly connected to a first one of said compensating masses and intermeshing with a second gear wheel that drives a second one of said compensating masses, the improvement wherein:

each of said compensating masses has an outer mantle surface in the form of a journal pin, and is radially guided in a direct manner via a respective bushing at said housing, and is axially guided via a bearing bracket that is fastened to a free face of said housing and engages annular grooves of said compensating masses;

each one of said compensating masses is an integral part of said respective gear wheel; and said housing has annular lubricant grooves that communicate via a bore in said housing with a lubricant line and a lubricant circulation system.

2. A bearing means according to claim 1, in which said integral part of said respective gear wheel and said compensating mass is in the form of an integral forged piece.

3. A bearing means according to claim 1, in which said integral part of said respective gear wheel and said compensating mass is in the form of an integral cast piece.

4. A bearing means according to claim 1, in which, for the exclusive compensation of said forces due to inertia, said compensating masses are formed such that a center of inertia is disposed in said symmetry plane of said crank shaft.

5. A bearing means according to claim 1, in which, for the compensation of said forces due to inertia and said moments of inertia, said compensating masses are formed such that a respective center of inertia thereof is disposed at a distance from said symmetry plane of said crank shaft, with a product of said distance and said respective force of inertia totally compensating said respective moment of inertia.

6. A bearing means according to claim 1, in which, for the compensation of said forces due to inertia and said moments of inertia, said compensating masses are formed such that a respective center of inertia thereof is disposed at a distance from said symmetry plane of said crank shaft, with a product of said distance and said respective force of inertia partially compensating said respective moment of inertia.

* * * * *